(12) United States Patent
Stagi et al.

(10) Patent No.: US 7,704,087 B1
(45) Date of Patent: Apr. 27, 2010

(54) CHECK VALVE FOR CHARGE TANK

(75) Inventors: William R. Stagi, Burien, WA (US); James Steele, Seattle, WA (US)

(73) Assignee: Utilx Corporation, Kent, WA (US)

( * ) Notice: Subject to any disclaimer, the term of this patent is extended or adjusted under 35 U.S.C. 154(b) by 928 days.

(21) Appl. No.: 11/220,385

(22) Filed: Sep. 6, 2005

Related U.S. Application Data

(60) Provisional application No. 60/607,339, filed on Sep. 3, 2004.

(51) Int. Cl.
*H01R 4/60* (2006.01)
*H01R 4/64* (2006.01)

(52) U.S. Cl. ...................................... 439/204
(58) Field of Classification Search .................. 439/88, 439/89, 190, 191, 204; 174/92, 76
See application file for complete search history.

(56) References Cited

U.S. PATENT DOCUMENTS

| | | | |
|---|---|---|---|
| 1,846,361 A | 2/1932 | Saylor | |
| 2,248,588 A | 7/1941 | Shanklin et al. | |
| 3,649,952 A | 3/1972 | Harmon | |
| 3,791,406 A | 2/1974 | Philipps | |
| 3,883,208 A | 5/1975 | Sankey et al. | |
| 4,077,494 A | 3/1978 | Spaude et al. | |
| 4,202,591 A | 5/1980 | Borgstrom | |
| 4,545,133 A | 10/1985 | Fryszczyn et al. | |
| 4,669,792 A | 6/1987 | Kjeldstad | |
| 4,888,886 A | 12/1989 | Eager, Jr. et al. | |
| 4,946,393 A | 8/1990 | Borgstrom et al. | |
| 5,082,449 A | 1/1992 | Borgstrom et al. | |
| 5,215,475 A | 6/1993 | Stevens | |
| 5,573,410 A | 11/1996 | Stepniak | |
| 5,846,093 A | 12/1998 | Muench, Jr. et al. | |
| 5,865,212 A * | 2/1999 | Gaines | 137/599.11 |
| 5,907,128 A | 5/1999 | Lanan et al. | |
| 6,332,785 B1 | 12/2001 | Muench, Jr. et al. | |
| 6,338,637 B1 | 1/2002 | Muench, Jr. et al. | |
| 6,489,554 B1 | 12/2002 | Bertini et al. | |
| 6,517,366 B2 | 2/2003 | Bertini et al. | |
| 6,811,418 B2 | 11/2004 | Jazowski et al. | |
| 6,843,685 B1 | 1/2005 | Borgstrom et al. | |

FOREIGN PATENT DOCUMENTS

| | | |
|---|---|---|
| DE | 1059527 | 6/1959 |
| WO | WO 01/28059 A1 | 4/2001 |

OTHER PUBLICATIONS

Eager, Jr. et al., "Extending Service Life of Installed 15-35 KV Extruded Dielectric Cables," *IEEE Transaction on Power Apparatus and Systems, PAS-103*(8):1997-2005, Aug. 1984.

* cited by examiner

*Primary Examiner*—Javaid Nasri
(74) *Attorney, Agent, or Firm*—Christensen O'Connor Johnson Kindness

(57) ABSTRACT

A method and apparatus are described to prevent the unwanted energizing of equipment not normally intended to be energized when delivering a fluid to an energized power cable. The method and apparatus relate to the installation of a fluid back-flow prevention device in the line or equipment carrying a fluid to the cable, and also providing a pressure relief device that may relieve excess pressure to prevent damaging equipment.

22 Claims, 5 Drawing Sheets

CHECK VALVE FOR CHARGE TANK

CROSS-REFERENCE TO RELATED APPLICATION

This application claims the benefit of U.S. Provisional Application No. 60/607,339, filed on Sep. 3, 2004, the disclosure of which is hereby expressly incorporated by reference.

FIELD OF THE INVENTION

The described embodiments relate to a process for power cables, and more particularly to a check value for a charge tank.

BACKGROUND OF THE INVENTION

The insulation of high voltage power cables will degrade after a period of time. One remediation process for the insulation of medium and high voltage power cables requires the injection of a remediation fluid into the free spaces of a cable. In many instances, the injection process takes place while the cables are energized. When the remediation process is performed on energized cables, special injection terminations (injection "elbows") may be used. Injection terminations are similar to industry standard cable terminations except that they have a special access port designed to allow for the injection of fluid into the cable. The fluid is commonly injected into underground cables from a fluid feed line, which is connected to a fluid feed tank.

One remediation process for the insulation of medium and high voltage power cables requires the injection of a remediation fluid into the free spaces of a cable's conductor. In many instances, the injection process takes place while the cables are energized. When the remediation process is performed on energized cables, a class of special injection terminations may be used. Injection terminations are similar to industry standard cable terminations except that they are sealed to the environment and have special access ports designed to allow for the injection of fluid into the cable.

The fluid is commonly injected into underground cables from a fluid feed line, which is connected to a fluid feed tank, at the injection termination. When fluid is injected into the cables at the injection port of the injection terminations, it is assumed that the fluid flow is only in one direction, flowing from the feed tank to the cable. However, as the cable fills and the fluid system begins to stabilize, temperature changes that occur inside the cable or outside in the environment around the feed tank can cause the pressure of the system to fluctuate. The pressure fluctuations can lead to instances where the pressure inside of the injection elbow is greater than the pressure inside of the fluid feed tank. At this point, fluid flow would reverse, moving from the injection elbow back into the fluid feed tank.

The fluid that travels in the reverse direction, out of the injection elbow, carries contaminants from the cable to the feed tank. These contaminants can be conductive or semi-conductive, effectively reducing the insulating value of the remediation fluid in the fluid feed line that separates the energized cable from the feed tank and a conductive pathway can be formed.

Therefore, there exists a need to prevent back flow of contaminated fluid from the injection elbow to the fluid feed tank.

SUMMARY OF THE INVENTION

A method for preventing energizing equipment is provided. One such method includes providing a fluid back-flow prevention device in a line carrying fluid between the equipment and an energized power cable.

A system for preventing energizing a fluid reservoir is also provided. In one embodiment, the system includes a line from the fluid reservoir leading to an energized power cable. The system also includes a back-flow prevention device installed in any part of the line or within the fluid reservoir, wherein the back-flow prevention device may prevent the flow of fluid contaminated with conductive materials that may energize the fluid reservoir.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
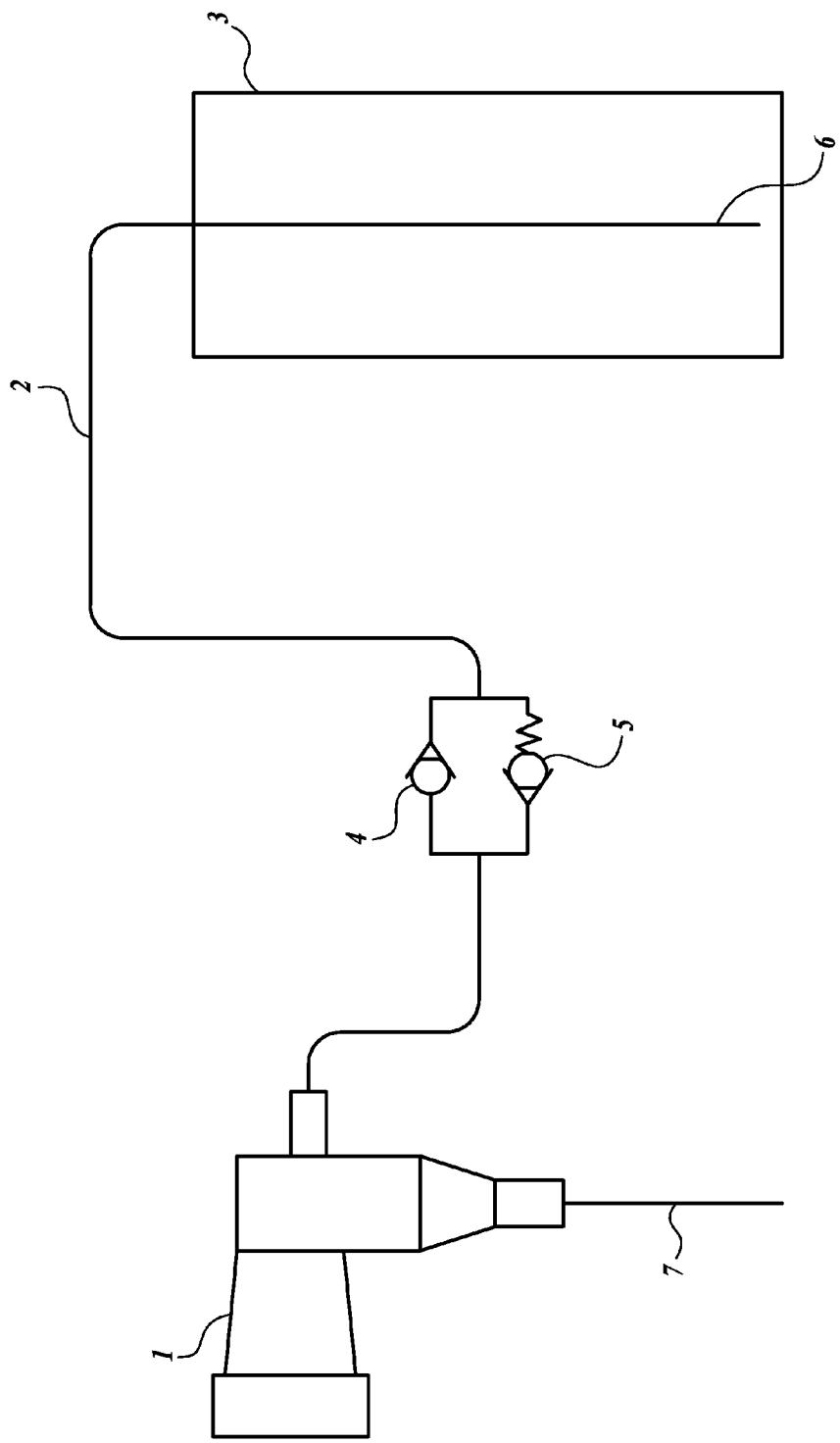
FIG. 1 is a process flow diagram of a system to carry fluid from a fluid feed tank to an injection termination with a back-flow prevention device and pressure relief device in the line between the fluid feed tank and the injection termination.

Referring to FIG. 1, a remediation fluid delivery system for remediating power cable insulation is schematically illustrated. The system includes a remediation fluid reservoir, such as feed tank 3, a fluid line 2 leading from the tank 3 to an injection termination 1, wherein the injection termination 1 is attached to power cable 7.

Remediation fluid is stored in the fluid feed tank 3 and can be supplied to the injection termination 1 (such as an injection elbow or other separable-type connector) via the fluid line 2. Fluid is drawn from the fluid feed tank 3 at the fluid inlet 6 of the fluid line 2. Fluid may flow by gravity from the tank 3 to the injection termination 1. A back-flow prevention device 4 is installed in the line 2 that allows the flow of fluid from the tank 3 to the injection termination 1, but prevents the flow of fluid from the injection termination 1 to the tank 3.

The system may also include a pressure relief device 5, installed in the line 2, that relieves pressure in the injection termination 1 or the cable 7 and delivers any over-pressure fluid into the tank 3 via line 2. Alternatively, overpressure in the line 2 may be vented to the ground or a specially designed destination for pressure relief devices. Fluid back-flow prevention device 4 and pressure relief device 5 may be installed in the line 2 in a parallel arrangement. In this embodiment, the pressure relief device 5 is installed as a bypass around the back-flow prevention device 4.

While back-flow prevention device 4 permits flow from the tank 3 to the injection termination 1 and cable 7, and prevents flow from the injection termination 1 and cable 7 to the tank 3, the pressure relief device 5 prevents flow from the tank 3 to the injection termination 1 and cable 7, but allows flow from the injection termination 1 and cable 7 to the tank 3 but only when the pressure in the injection termination 1 or cable 7 exceeds a predetermined pressure limit. Check valves are one example of the back-flow prevention device 4 that may take may forms. FIG. 1 illustrates a springless, ball-type check valve as the back-flow prevention device 4.

The pressure relief device 5 is illustrated as a spring-biased, ball-type check valve. The spring biases the ball against a valve seat, thus closing the valve, but will open when the fluid pressure on the left side of the ball exceeds the force of the spring pushing the ball against the valve seat. The spring may have a predetermined pressure limit, which, if exceeded will cause the valve to open. However, other implementations of the back-flow prevention device 4 and pressure relief device 5 are possible The system of FIG. 1 is designed to operate in the following manner. Under some circumstances, because of high daytime temperatures or numerous other factors, the pressure within the injection termination 1 or the cable 7, may begin to build such that the pressure in the cable 7 or injection termination 1 exceeds the pressure at the tank 3. In a system without a back-flow prevention device 4, the fluid may change directions, leading to contamination present in the power cable 7 to travel through the injection termination 1, and through the line 2, and result in contamination of the tank 3.

Because these contaminants may be electrically conductive, it is possible that the tank 3 may become energized. The embodiment of FIG. 1 is designed to prevent energizing equipment, such as tank 3, by providing the check valve 4 in line 2 that permits the flow of remediation fluid from tank 3 to injection termination 1 and cable 7, but prevents the flow of fluid from cable 7 and injection termination 1, through line 2, to tank 3. The system of FIG. 1 is also designed to relieve overpressure in the cable 7 or injection termination 1 by the installation of the pressure relief device 5, which is capable of opening at a predetermined pressure limit to relieve the pressure in injection termination 1 or cable 7 to prevent damage to the injection termination 1 or the cable 7.

The system is shown relieving pressure to tank 3, but other configurations are possible. The pressure relief device 5 may be a burst disk, a poppet valve or any other suitable device that fails or opens at a predetermined pressure limit to relieve an overpressure situation and permit fluid to back-flow to the fluid feed tank 3, but under limited situations. In one embodiment, the pressure relief device 5 may release at a pressure of about 15 psia to about 18 psia. In another embodiment, the pressure relief device 5 may release at a pressure of about 30 psia to about 35 psia. Although certain pressure ranges have been described, any suitable pressure limit may be designated as the high pressure limit for pressure relief device 5.

Figure 2:
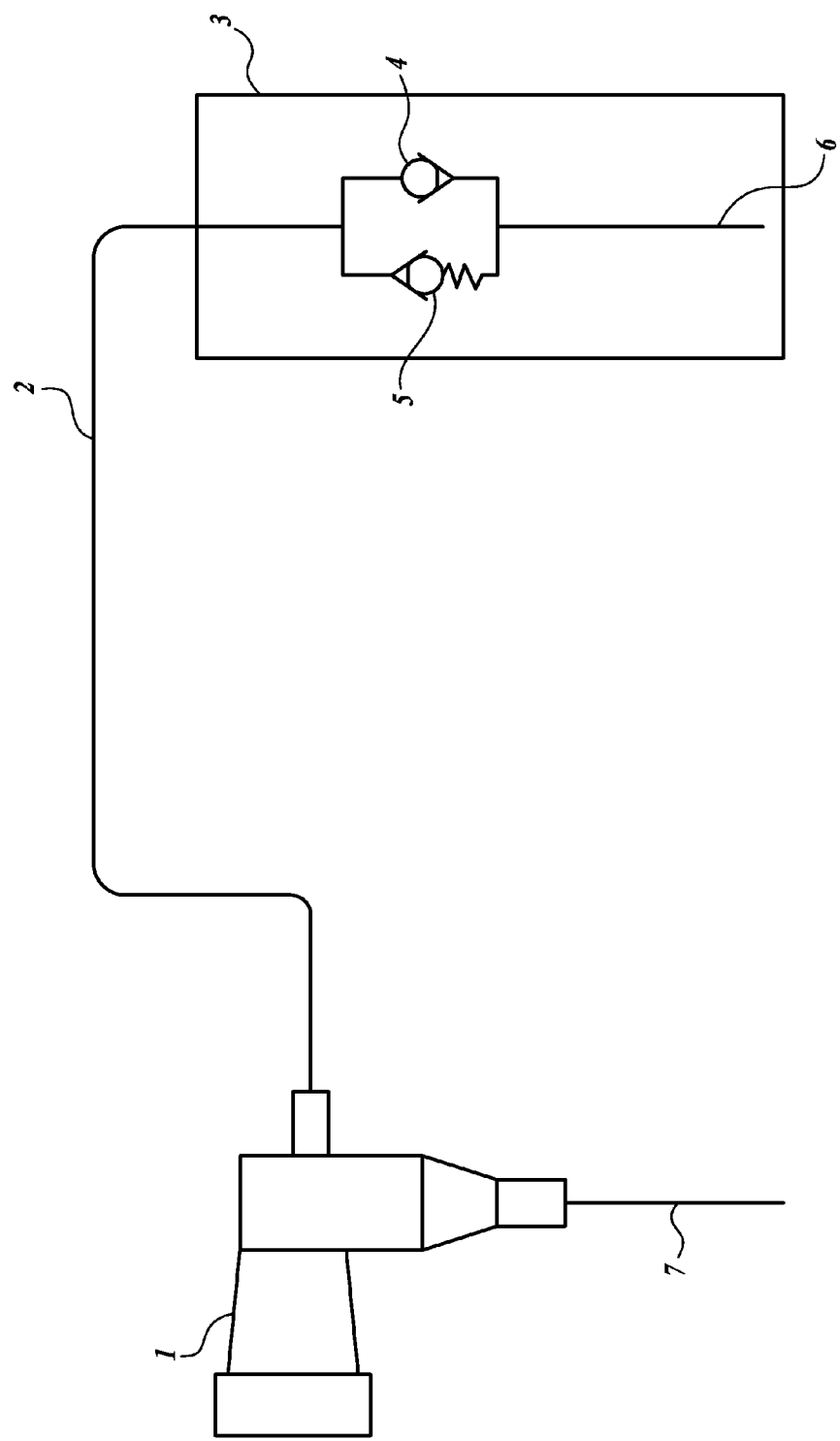
FIG. 2 is a process flow diagram of a system to carry fluid from a fluid feed tank to an injection termination with the back-flow prevention device and pressure relief device in the fluid feed tank.

Referring to FIG. 2, in another embodiment of the invention, the back-flow prevention device 4 and the pressure relief device 5 are installed at the inlet 6 of the line 2 within the fluid feed tank 3, preventing back-flow of fluid from returning to the fluid feed tank 3, unless the pressure at the pressure relief device 5 exceeds the designated high pressure limit.

Figure 3:
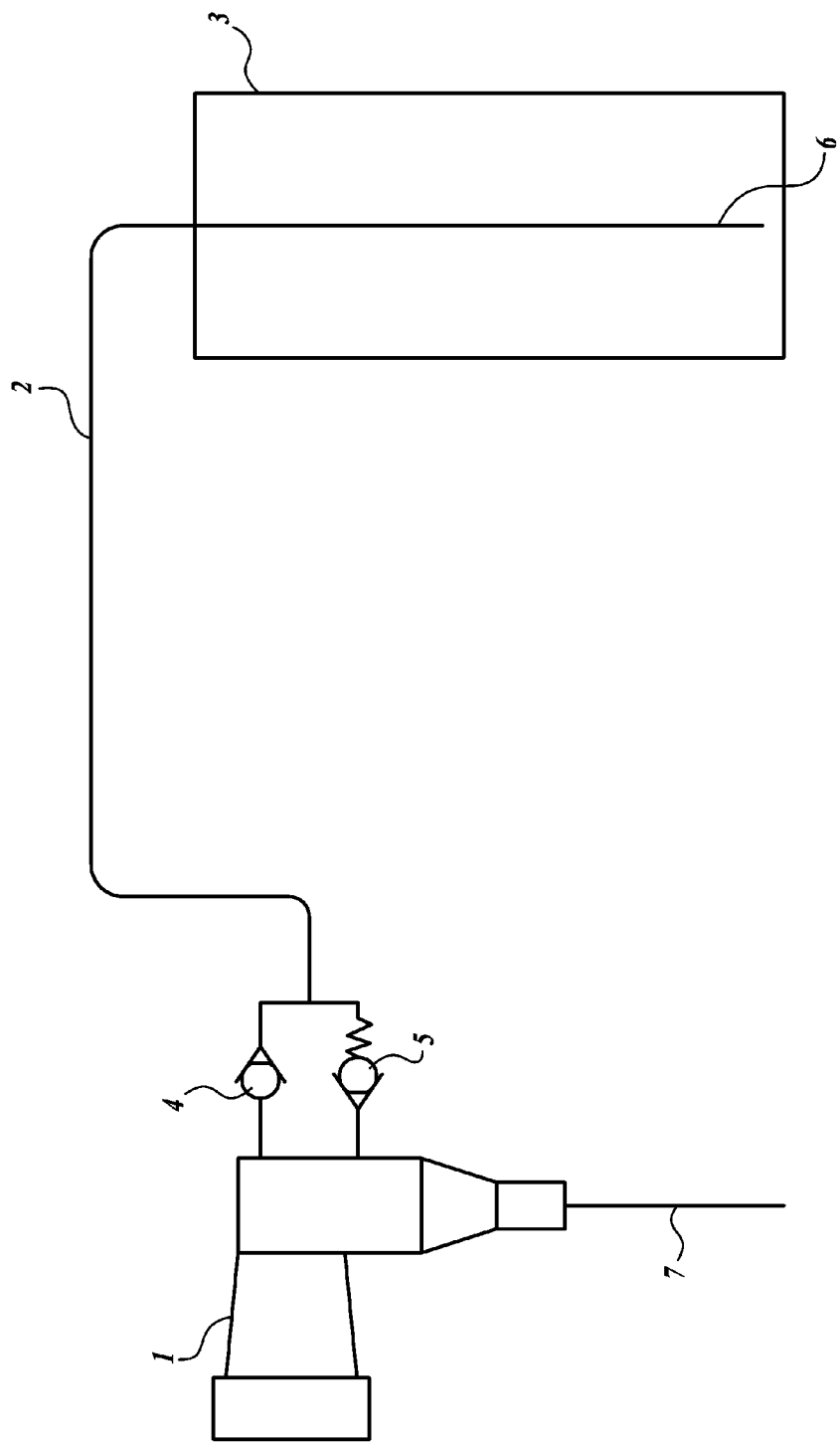
FIG. 3 is a process flow diagram of a system to carry fluid from a fluid feed tank to an injection termination with the back-flow prevention device and pressure relief device in the injection termination.

Referring to FIG. 3, in another embodiment of the invention, the back-flow prevention device 4 and pressure relief device 5 are installed at the injection termination 1. Representative implementations of this configuration are described below. The back-flow prevention device 4 and pressure relief device 5 prevent the back-flow of fluid from the injection termination 1 and cable 7 to the feed tank 3, unless the designated high pressure limit of the pressure relief device 5 is exceeded.

Figure 4:
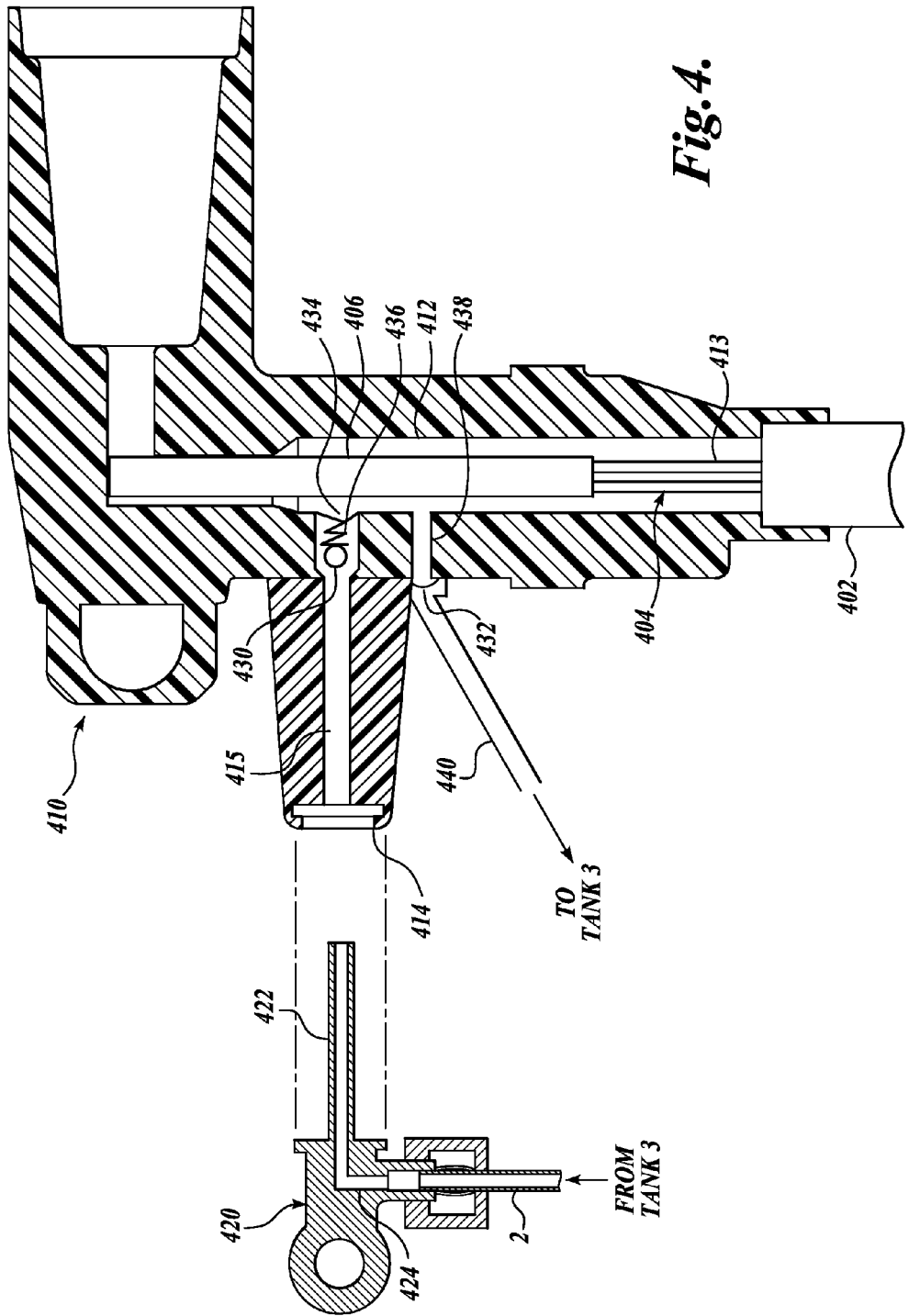
FIG. 4 is a cross-sectional illustration of an injection termination and injection plug for preventing back-flow of remediation fluid and preventing over-pressure in the injection termination or cable.

FIG. 4 illustrates an injection termination 410 and injection plug 420 formed in accordance with one embodiment of the present invention. Injection termination 410 is adapted to introduce remediation fluid into power cable 402. Power cable 402 includes a conductive core 404 surrounded by an insulation layer 406. The conductive core 404 includes a plurality of electrically conductive strands 413. Although a plurality of conductive strands 413 is preferred, a cable 402 having a single conductive strand is also within the scope of the present invention. Further, although the injection termination 410 is illustrated as a load-break termination, other types of terminations, such as tee-body or splice-type terminations which occur at cable junctions, are also within the scope of the present invention.

The injection termination 410 includes a fluid chamber 412 and an injection port 414. The injection port 414 permits the introduction of the remediation fluid into the cable 402 while the cable 402 is energized. Remediation fluid is injected through the injection port 414 and into the fluid chamber 412 by a canal 415, thus, allowing fluid to enter the cable's 402 insulation through the interstitial spaces between the cable strands 413.

Still referring to FIG. 4, remediation fluid enters the injection port 414 by way of the injection plug 420. The injection plug 420 includes a conduit 424 and a stem portion 422. In operation, the stem portion 422 is inserted into the injection port 414 to allow for the introduction of the remediation fluid into the fluid chamber 412. Remediation fluid is fed to injection plug 402 via line 2 coming from fluid feed tank 3.

Injection termination 410 includes a back-flow prevention device and a pressure relief device. In the embodiment of FIG. 4, the back-flow prevention device takes the form of a ball 430 biased by spring 436 to seat ball 430 against an enlarged diameter portion of canal 415. When the fluid pressure on the left side of ball 430 exceeds the spring force of spring 436, the ball 430 is moved away from the closed position, and allows fluid to pass by the ball 430 and exit through opening 434 leading to fluid chamber 412. The stem portion 422 of injection plug 420 is short so as not to force open the ball valve during fluid delivery.

Thus, this embodiment is suited to prevent back-flow during delivery of fluid. During delivery of fluid, the ball-type, check value 430 remains open and may return to the closed position when pressure fluctuations cause the pressure in chamber 412 to be greater than the pressure at the injection port 414. Thereby, preventing fluid with contaminants including electrically conductive materials from entering the injection port 414 and line 2, and creating a non-conductive barrier between the conductive core 404 and a zero or lower voltage potential or "ground."

An alternate configuration of a ball-type, check valve may be provided without the spring 436, such as in a vertical configuration, so that the force to seal the ball against the valve seat is provided by gravity.

Injection termination 410 includes a pressure relief device. In one implementation, a port, such as port 438, may be provided in the injection termination 410. Port 438 is in communication with and experiences the pressure within fluid chamber 412. A burst disk 432 (or rupture disk) is provided at one opening of port 438. Burst disk 432 may burst at a predetermined pressure setting, depending on the thickness of the burst disk material, for example. Line 440 is connected to the opposite side of burst disk 432 that is opposite to port 438. Upon rupturing of the burst disk 432, fluid may be carried through line 440 back to tank 3, or alternatively any destination designed to accept burst disk 432 discharges.

Figure 5:
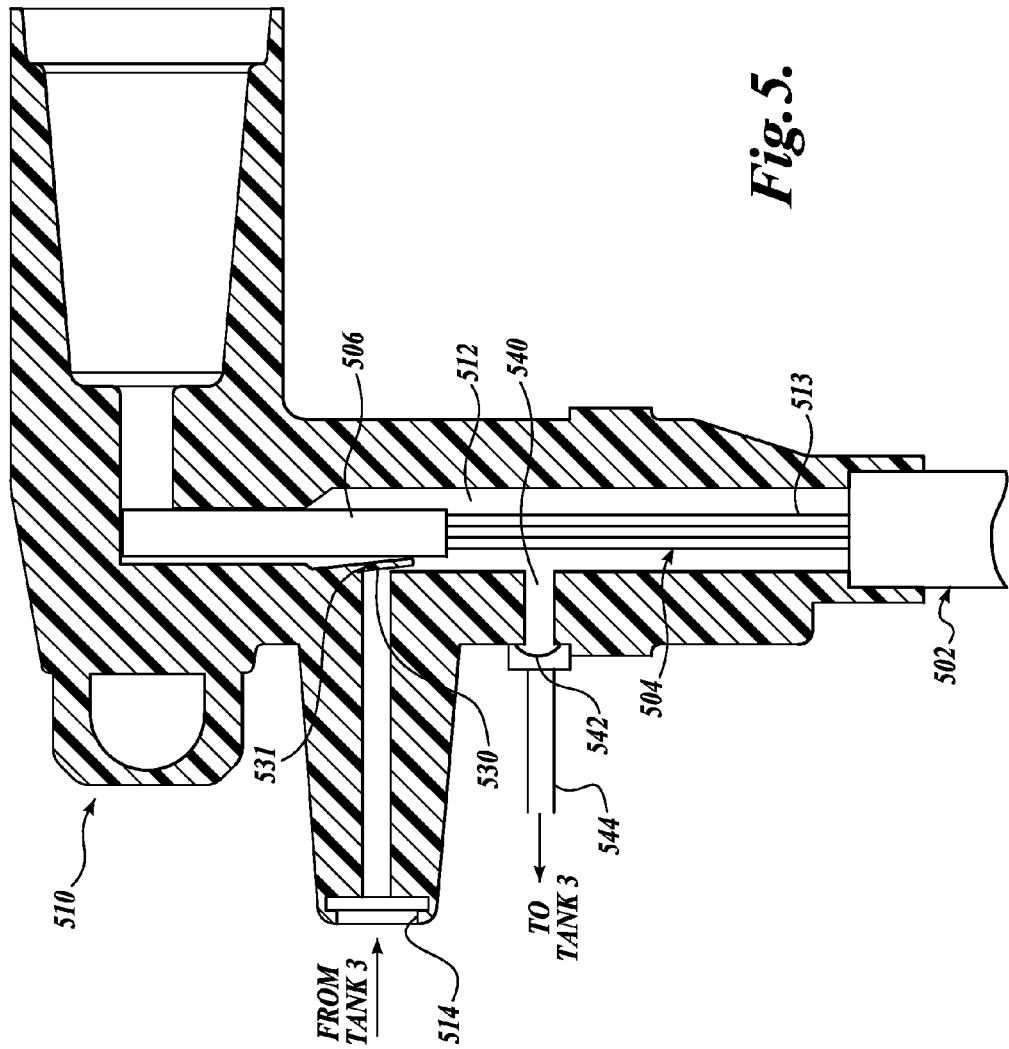
FIG. 5 is a cross-sectional illustration of an injection termination for preventing back-flow of remediation fluid and preventing over-pressure in the injection termination or cable.

FIG. 5 illustrates another embodiment of an injection termination 510 constructed in accordance with the present invention. An injection plug is not shown, but may be an injection plug similar to injection plug 420 of FIG. 4. The injection plug is not shown for brevity. The injection termination 510 may be identical in materials and operation to the first embodiment described above with the exception that the back-flow prevention device is implemented as flap valve 530. Injection termination 510 is adapted to introduce remediation fluid into power cable 502. Power cable 502 includes a conductive core 504 surrounded by an insulation layer 506. The conductive core 504 includes a plurality of electrically conductive strands 513. Although a plurality of conductive strands 513 is preferred, a cable 502 having a single conductive strand is also within the scope of the present invention. Further, although the injection termination 510 is illustrated as a load-break termination, other types of terminations, such as tee-body or splice-type terminations which occur at cable junctions, are also within the scope of the present invention.

In one embodiment, the flap valve 530 is suitably located at the intersection of the injection port 514 and the fluid chamber 512. The flap valve 530 may be integrally connected to the injection termination 510 by a live hinge, or may be fastened to the injection termination 510 by a mechanical hinge 531. In one embodiment, the flap valve 530 is normally biased in the closed position.

Remediation fluid may be fed from tank 3 through a line to an injection plug (not shown) that is then inserted into injection port 514 to introduce a remediation fluid into fluid chamber 512. As remediation fluid is introduced into the injection port 514, the flap valve 530 is forced open by the fluid pressure of the incoming remediation fluid. The flap valve 530 is not physically opened by the stem portion of the injection plug, therefore, this embodiment prevents the back-flow of fluid during delivery and not just after discontinuing delivery, as would be the case with an injection plug that props the flap valve open. During delivery of fluid, the flap valve 530 remains open and may return to the closed position when pressure fluctuations cause the pressure in chamber 512 to be greater than the pressure at the injection port 514. Thereby, preventing fluid with contaminants including electrically conductive materials from entering the injection port 514, and creating a non-conductive barrier between the conductive core 504 and a zero or lower voltage potential or "ground." Injection termination 510 also includes port 540 that is open to fluid chamber 512 Port 540 has a pressure relief device, such as burst disk 542 connected thereto. Burst disk 542 is set to relieve the pressure within chamber 512 at a predetermined pressure setting. If burst disk 542 ruptures, the fluid may be vented through line 544 to return to tank 3. Alternatively, fluid may be routed to any suitable destination.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for preventing energizing equipment that supplies fluid from a storage tank to a power cable, comprising:
    (a) providing a fluid back-flow prevention device in a line carrying the fluid between an injection termination and the storage tank of the fluid, the fluid back-flow device permitting the fluid flow in only a first direction; and
    (b) providing a pressure relief device in the line, the pressure relief device permitting the fluid flow to the storage tank in a second direction when a predetermined pressure in the line is exceeded.

2. The method of claim 1, wherein the power cable is a high voltage cable.

3. The method of claim 1, wherein the power cable is at a potential of about 35 kV or greater.

4. The method of claim 1, wherein the power cable is at a potential of about 15 kV or greater.

5. The method of claim 1, further comprising preventing back-flow from the cable to the injection termination of fluid having contamination comprising conductive materials.

6. The method of claim 1, further comprising preventing back-flow from the cable to the injection termination of fluid comprising conductive materials, wherein the conductive materials are produced by high voltages.

7. The method of claim 1, wherein the fluid back-flow prevention device is installed at an inlet of the line within the injection termination.

8. The method of claim 1, wherein the pressure relief device is provided within the equipment, and the fluid back-flow prevention device is provided at one opening of an access port of the equipment.

9. The method of claim 1, wherein the pressure relief device permits the fluid flow to a discharge area in a second direction when a predetermined pressure in the line is exceeded.

10. A system for preventing energizing a fluid reservoir wherein the system supplies fluid from the fluid reservoir to a power cable, the system comprising:
    a line from the fluid reservoir leading to the power cable;
    a back-flow prevention device installed within the fluid reservoir, wherein the back-flow prevention device can prevent the flow of fluid contaminated with conductive materials that may energize the fluid reservoir; and
    a pressure relief device for permitting the fluid flow to the fluid reservoir when a predetermined pressure in the line is exceeded.

11. The system of claim 10, wherein the power cable is at a potential of about 15 kV or greater.

12. The system of claim 10, wherein the power cable is at a potential of about 35 kV or greater.

13. The system of claim 10, wherein the back-flow prevention device is a check valve, a ball valve, or a flap valve.

14. The system of claim 10, wherein the pressure relief device is a burst disk, rupture disk, ball valve, or check valve.

15. The system of claim 10, further comprising the pressure relief device installed in parallel with the back-flow prevention device, to discharge into the fluid reservoir to prevent fluid pressure from exceeding a predetermined limit.

16. An injection termination for the introduction of remediation fluid from a storage tank into a cable, comprising a back-flow prevention device and a pressure relief device are installed within the injection termination a fluid chamber located in a housing of the injection termination, the back-flow prevention device for preventing back-flow of remediation fluid during the delivery of remediation fluid, and the pressure relief device for permitting the remediation fluid flow to the storage tank when a pressure limit in the fluid chamber of the injection termination or—cable is exceeded.

17. The injection termination of claim 16, wherein the back-flow prevention device comprises a check valve.

18. The injection termination of claim 16, wherein the back-flow prevention device comprises a ball valve.

19. The injection termination of claim 16, wherein the back-flow prevention device comprises a flap valve.

20. The injection termination of claim 16, wherein the pressure relief device comprises a burst disk.

21. An injection termination for introduction of fluid from a storage tank into a cable, the injection termination comprising:

a back-flow prevention device installed between a first port and a fluid chamber located in a housing of the injection termination, the back-flow prevention device for permitting the fluid flow to the fluid chamber only in a first direction during delivery of the fluid; and a pressure relief device installed between a second port and the fluid chamber for permitting the fluid flow to the storage tank in a second direction when a pressure limit in the fluid chamber is exceeded.

22. The injection termination of claim 21, wherein the fluid is injected through the first port into the fluid chamber.

* * * * *